United States Patent
Scherer et al.

(10) Patent No.: US 8,629,419 B2
(45) Date of Patent: Jan. 14, 2014

(54) METHOD AND APPARATUS FOR READING OUT X-RAY INFORMATION STORED IN STORAGE PHOSPHOR PLATE

(75) Inventors: Horst Scherer, Unterhaching (DE); Thomas Hartmann, Uffing am Staffelsee (DE); Stephan Mair, Weilheim (DE); Heinz-Josef Romanski, Rotenburg a. d. Fulda (DE)

(73) Assignee: Agfa HealthCare NV, Mortsel (BE)

( * ) Notice: Subject to any disclaimer, the term of this patent is extended or adjusted under 35 U.S.C. 154(b) by 1104 days.

(21) Appl. No.: 11/836,483

(22) Filed: Aug. 9, 2007

(65) Prior Publication Data

US 2008/0055587 A1 Mar. 6, 2008

(30) Foreign Application Priority Data

Aug. 29, 2006 (EP) .................................. 06119721

(51) Int. Cl.
*G11B 7/004* (2006.01)
(52) U.S. Cl.
USPC ........................................................ 250/586
(58) Field of Classification Search
USPC ........................................................ 250/586
See application file for complete search history.

(56) References Cited

U.S. PATENT DOCUMENTS

| | | | |
|---|---|---|---|
| 7,170,080 B2 | 1/2007 | Fasbender et al. | |
| 2002/0043625 A1* | 4/2002 | Shimizu et al. | 250/458.1 |
| 2005/0247897 A1 | 11/2005 | Haug et al. | |
| 2006/0054845 A1 | 3/2006 | Satoh et al. | |
| 2006/0091337 A1 | 5/2006 | Mair | |
| 2006/0180773 A1 | 8/2006 | Frankenberger et al. | |
| 2006/0180777 A1 | 8/2006 | Frankenberger et al. | |
| 2007/0152179 A1 | 7/2007 | Mair et al. | |
| 2007/0153975 A1 | 7/2007 | Mair et al. | |

FOREIGN PATENT DOCUMENTS

| | | |
|---|---|---|
| DE | 34 04 149 A1 | 8/1985 |
| DE | 40 33 084 A1 | 4/1992 |
| DE | 4033084 A1 * | 4/1992 |

OTHER PUBLICATIONS

Patent Abstracts of Japan, JP Publication No. 02071662, Publication Date: Mar. 12, 1990, Applicant: Fuji Photo Film Co., Ltd.
European Search Report from EP 06119721.6, filed Aug. 29, 2006.

* cited by examiner

*Primary Examiner* — David Porta
*Assistant Examiner* — Shun Lee
(74) *Attorney, Agent, or Firm* — Houston & Associates, LLP

(57) ABSTRACT

A method and to a corresponding apparatus reads out X-ray information stored in a storage phosphor plate (1), the storage phosphor plate (1) being irradiated with stimulation light (3) and so being stimulated into emitting emission light which is collected by a detector (9) during several measuring times and being converted into corresponding emission light signals (S, R). In order to guarantee high reliability when examining sensitivity fluctuations, in particular with different types of detectors, provision is made such that reference measurements are taken by the detector (9) during several reference measuring times and several reference signals are thus produced, the individual reference measuring times falling respectively between the measuring times, and the reference signals being used for examining the sensitivity of the detector (9) to emission light.

20 Claims, 3 Drawing Sheets

METHOD AND APPARATUS FOR READING OUT X-RAY INFORMATION STORED IN STORAGE PHOSPHOR PLATE

RELATED APPLICATIONS

This application claims priority to European Patent Application No. EP06119721.6. filed on Aug. 29, 2006, which is incorporated herein by reference in its entirety.

BACKGROUND OF THE INVENTION

One possibility for recording X-ray images is to store the X-ray radiation passing through an object, for example a patient, as a latent image in a so-called storage phosphor layer. In order to read out the latent image, the storage phosphor layer is irradiated with stimulation light and so stimulated into emitting emission light. The emission light, the intensity of which corresponds to the image stored in the storage phosphor layer, is collected by an optical detector and converted into electrical signals. The electrical signals are further processed as required, and are finally made available for analysis, in particular for medical/diagnostic purposes, by displaying them on appropriate display equipment such as e.g. a monitor or a printer.

Methods and apparatuses are known from US 2006/0054845 A1 and JP 1990-071662 A with which the light emitted by a reference light source is collected by a photomultiplier and converted into a corresponding reference signal, which is compared to a desired value which corresponds to a previously determined intensity of the light emitted by the reference light source. Dependently upon the result of this comparison, the high voltage applied to the photomultiplier is changed in order to correct any sensitivity losses of the photomultiplier. Sensitivity fluctuations can not always be reliably identified and, if applicable, corrected here. This applies in particular to specific types of photomultipliers and other detectors, such as e.g. CCD or photodiode lines.

SUMMARY OF THE INVENTION

The invention relates to a method and to a corresponding apparatus for reading out X-ray information stored in a storage phosphor plate.

It is an object of the invention to specify a method and a corresponding apparatus which enables the most reliable possible examination of sensitivity fluctuations, in particular with different types of detectors.

The invention is based upon the idea of reference measurements being taken with the detector during several reference measuring times and several corresponding reference signals are thus produced which are used for examining the sensitivity of the detector to emission light.

In doing so, the individual reference measuring times, in which the reference measurements are taken, fall between the measuring times, in which the emission light emitted by the storage phosphor plate is collected by the detector.

In this way, during the read-out from a storage phosphor plate, continuous examination of the sensitivity of the detector in direct temporal proximity to the respective measuring times in which the detector collects the emission light is achieved, by means of which high reliability when examining possible sensitivity fluctuations of the detector is guaranteed.

In doing so, even sensitivity fluctuations occurring at short intervals of time can be identified, so that the invention can be used with a wide variety of types of detectors which e.g. have a previously not precisely known and/or or a very large sensitivity drift.

Moreover, by means of the invention temporal changes in the electronics downstream of the detector in which e.g. a signal conversion or processing takes place, are recorded and examined.

In one preferred embodiment of the invention, provision is made such that at least one reference value is derived from the reference signals, the at least one reference value being used for examining the sensitivity of the detector to emission light. Preferably, the reference value is derived by averaging a specific number of reference signals, in particular between 5 and 25 reference signals. In this way, particularly reliable examination of any sensitivity fluctuations of the detector is achieved.

Moreover, it is preferred if in order to examine the sensitivity of the detector the reference signals or the reference value derived from the reference signals are or is compared to a desired reference value. Thereupon the sensitivity of the detector can be changed if the reference signals or the reference value derived from the reference signals deviate or deviates from the desired reference value. In this way the sensitivity of the detector can be examined and if appropriate be corrected to a desired sensitivity required for the respective application during the read-out of a storage phosphor plate.

Alternatively or in addition to the embodiment described above, the emission light signals produced by the detector during the measuring times can be corrected if the reference signals or the reference value derived from the reference signals deviate or deviates from the desired reference value. In this way a required correction is greatly simplified because this does not need to be corrected by changing the sensitivity, for example by varying the high voltage of a photomultiplier, during the read-out of the storage phosphor plate, but can be implemented by simple signal processing of the emission light signals after the complete read-out process has ended.

In a further preferred embodiment of the invention provision is made such that the reference light emitted by a reference light source is collected by the detector during the reference measuring times and converted into the reference signals. Here, the reference light source preferably only emits the reference light during the reference measuring times which fall between the measuring times. In this way it is guaranteed that the reference light is only emitted between the measuring times and so can not disrupt collection of the emission light by the detector during the measuring times.

In a further embodiment of the invention, provision is made such that the reference light emitted by the reference light source has an intensity which is of different levels in different reference measuring times. In this way the detector collects reference light intensities of different levels during several reference measuring times and converts this into correspondingly different reference signals which contain information about the dependency of the sensitivity of the detector upon the respective intensity of the light which is collected by the detector, and in this way provides clues regarding any non-linearity of the detector sensitivity. Upon the basis of this information the emission light signals produced by the detector can be corrected by means of which the reliability of the reproduction and presentation of the X-ray information read out from the storage phosphor plate is increased.

In one variation of the invention provision is made such that the detector is a semiconductor detector which is operated during the reference measuring times in a reference mode in which the reference signals are produced by a reference voltage being applied to the detector. By applying a reference voltage, in particular a so-called bias voltage, the semiconductor detector is placed in a state which corresponds to the state while light is being collected, for example from a reference light source. In this way, with reference measurements a separate reference light source can be dispensed with.

In a further embodiment of the invention provision is made such that the detector produces several offset signals during several offset measuring times which respectively fall between measuring times and in which no irradiation of the storage phosphor plate with stimulation light and so no emission of emission light takes place and also the reference light source does not emit any reference light, from which offset signals at least one offset value is derived which is a measure for a background which is caused in particular by ambient light and/or the dark currents of the detector and is used to correct the emission light signals. In this way the influence of ambient light and dark currents of the detector upon the emission light signals is reliably eliminated or at least reduced, and so reliability when reproducing the read-out X-ray information is increased.

It is preferred here if the individual reference and offset measuring times falling between the measuring times follow on from one another alternately and are separated from one another by at least one measuring time respectively. In this way examination of the detector sensitivity on the one hand and correction to the emission light signals on the other hand are achieved at approximately the same time as the respective collection of emission light during a measuring time.

It is preferred here if the sum of a measuring time and a subsequent reference or offset time gives a cycle duration and the measuring time is between 60 and 80% of the cycle duration and the reference or offset time is correspondingly between 40 and 20% of the cycle duration. In this way it is possible on the one hand for the measuring time for collecting the emission light to be sufficiently long so that as much emission light as possible can be collected, but at the same time the reference or offset time is not too short for still guaranteeing sufficiently high precision when examining or correcting the detector sensitivity or the background.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 1 and 1A are schematic diagrams showing exemplary embodiments of the invention;

DETAILED DESCRIPTION OF THE PREFERRED EMBODIMENTS

Figure 1:
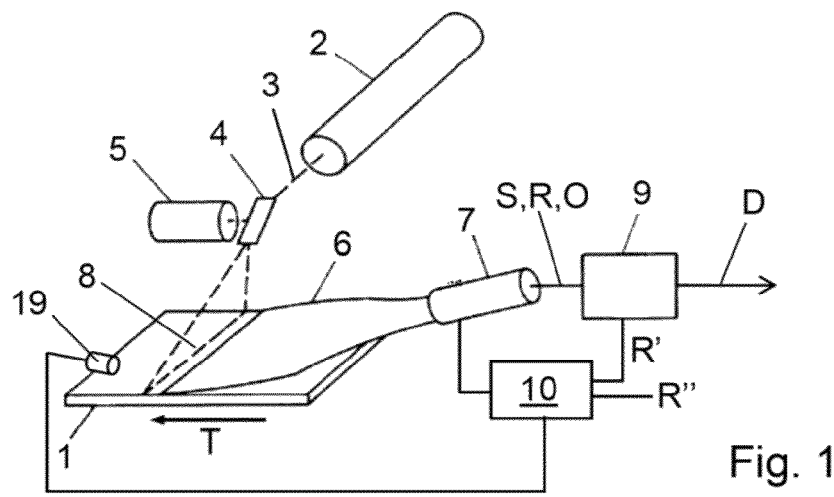

FIG. 1 shows a first exemplary embodiment of the apparatus according to the invention for reading out a storage phosphor plate 1. A laser 2 produces a stimulation beam of light 3 which is deflected by a deflection element 4 set in rotation or in movement by a drive, in particular a motor 5 or a galvanometer such that the beam of light is moved along a line 8 over the storage phosphor plate 1 to be read out. The deflection element 4 is preferably a mirror, in particular a polygon mirror or a galvanometer mirror.

During the movement of the stimulation beam of light 3 along the line 8, the storage phosphor plate 1 emits emission light dependently upon the X-ray information stored therein and which is collected by an optical collecting device 6, for example a light conductor bundle, forwarded, and collected by an optical detector 7, preferably a photomultiplier, coupled to the collecting device 6, and converted into corresponding analogous emission light signals S. The emission light signals S are conveyed to a processing device 9 in which digital emission light signals D are derived from the analogous emission light signals S.

By conveying the storage phosphor plate 1 in conveyance direction T the storage phosphor plate 1 is successively read out along individual lines 8, a two-dimensional image being obtained which is made up of individual pixels to each of which a signal value is assigned by the emission light signals D.

Disposed in the region of the inlet to the collecting device 6 is a reference light source 19 which emits reference light. The wavelength range of the reference light is preferably similar or identical to the wavelength range of the emission light. In particular, a light emitting diode (LED) which emits blue light is used as a reference light source 19. The reference light is collected by the optical collecting device 6, forwarded to the detector 7, collected by the latter and converted into corresponding reference signals R.

Alternatively, the reference light source 19 can be disposed at another point. It can e.g. be integrated into the collecting device 6 or be fitted directly in front of the inlet region of the detector 7 (neither illustrated). It can also e.g., be fitted directly onto the detector 7 and/or be integrated into the detector 7, as indicated by the reference light source 19' drawn with dashed lines as shown in FIG. 1A.

In a variation of the invention, in addition to the reference light source 19 a photodetector, preferably a photodiode, is provided which collects part of the reference light emitted by the reference light source 19 and converts it into a corresponding light source signal L. The light source signal L is conveyed to a control circuit, and compared here with a pre-specifiable desired light source value L'. If the light source signal L deviates from the desired light source value L', the intensity of the reference light is correspondingly adjusted, e.g. by increasing or reducing the supply voltage of the reference light source 19 until the light source signal L corresponds again to the desired light source value L'.

In the example illustrated here, the detector 7, the reference light source 19 and the processing device 9 are connected to a control device 10 by means of which the detector 7, the reference light source 19 and the processing device 9 are controlled in a way according to the invention.

Figure 2:
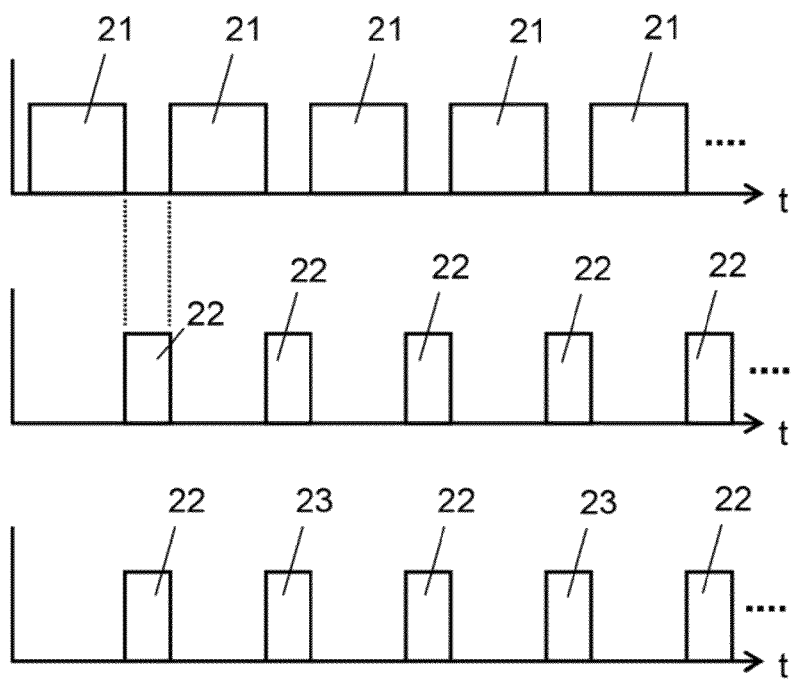
FIG. 2 is a timing diagram illustrating the sequence over time of the individual steps of the method according to the invention.
Figure 1:
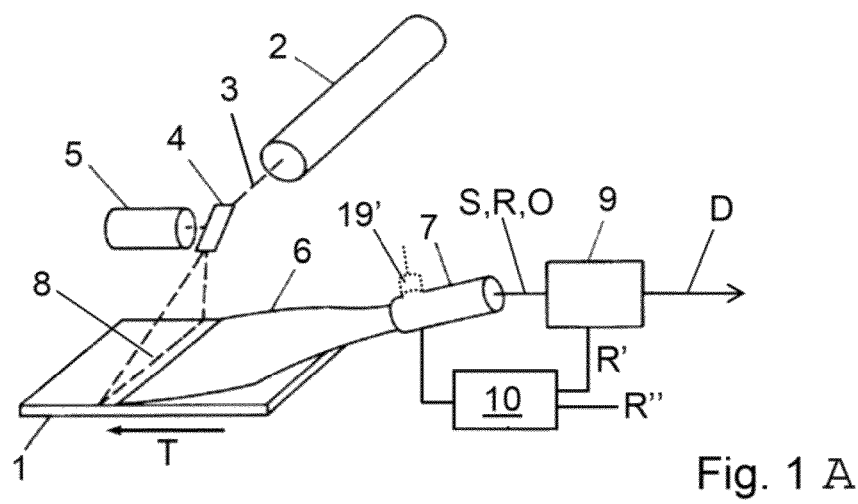

FIG. 2 shows diagrams illustrating the sequence of the individual steps of the method according to the invention dependently upon time t. By means of the control device 10 the detector 7 is controlled such that the latter collects emission light passing out of a line 8 of the storage phosphor plate during a respective measuring time 21 (see top diagram) and converts it into a corresponding emission light signal S. The reference light source 19 is preferably controlled such that it does not emit any reference light during the measuring times 21. In a measuring time 21 following this measuring time the emission light passing out of a further line 8 is then collected and a corresponding emission light signal S is produced etc. Overall, in this way the storage phosphor plate 1 is read out line by line during a plurality of measuring times 21, a plurality of corresponding emission light signals S being produced.

According to the invention individual reference measuring times 22 fall between the individual measuring times 21—i.e. after the end of a measuring time 21 and before the start of a subsequent measuring time 21—(see middle diagram). During these reference measuring times 22 the reference light source 19 and the detector 7 are controlled by the control device 10 such that the reference light source 19 emits reference light which is collected by the detector 7 and converted into corresponding reference signals R.

The reference signals R produced during several reference measuring times 22 are subjected to averaging in the processing device 9, a reference value R' being obtained which is compared in the control device 10 to a pre-specified desired reference value R".

In the event that the reference value R' deviates from the desired reference value R", the sensitivity of the detector 7 is changed by the control device 10. In the example shown, in which the detector 7 is in the form of a photomultiplier, the high voltage applied to the photomultiplier is in addition correspondingly changed.

If for example the comparison shows that the reference value R' is smaller than the desired reference value R", this suggests reduced sensitivity of the detector 7 which is compensated by an increase in the high voltage applied to the photomultiplier. If, however, the reference value R' is greater than the desired reference value R", the high voltage applied to the photomultiplier is therefore reduced.

By continuously taking reference measurements in reference measuring times 22 which fall between the actual measuring times 21 for the emission light, and by successively examining, and if appropriate correcting, the sensitivity of the detector 7, high reliability when examining and correcting any sensitivity fluctuations of the detector 7 during the read-out of a storage phosphor plate 1 is achieved.

In a particularly advantageous variation of the method according to the invention, the apparatus shown in this exemplary embodiment is controlled such that reference measurements during the reference measuring times 22 and offset measurements during offset measuring times 23 are alternately taken between the measuring times 21, as shown in the bottom diagram of FIG. 2.

During the offset measuring times 23 both the reference light source 19 and the laser 2 are switched off so that the detector 7 can only collect ambient light and/or dark currents of the detector 7 itself and converts these into corresponding offset signals O. From several, typically between 5 and 25, offset signals O, an offset value is derived in the processing device 9 by averaging, and this is a measure for the background (offset) and is used for correcting the individual emission light signals S and D by this being deducted from the emission light signals S and D.

In the examples described above, the invention was illustrated in connection with an individual optical detector 7. Moreover, the invention can advantageously be used for controlling several optical detectors 7 arranged in a row, in particular in so-called photomultiplier arrays (PMT arrays).

When operating a PMT array, one mostly has to count upon additional artefacts if the respective sensitivities of the individual PMTS drift with different strengths. Due to this, additionally disruptive stripes appear in the image read out. The invention makes it possible in a simple and quick way to equalise drift between the individual PMTs.

With this application it is fundamentally possible to provide all of the components of the invention, in particular the reference light source 19 and the control device 10, including the high voltage supply, the pre-amplifier and the control circuit, separately for each PMT.

Alternatively it is possible to use just one pre-amplifier for all of the PMTs and/or just one high voltage power supply for all of the PMTs, readjustment of the high voltage by a specific amount being possible individually for each PMT.

Moreover, it is possible to provide a reduced number of reference light sources 19, e.g. one reference light source 19 respectively between two PMTs. For this, the signals from all bar one of the PMTs can be switched off.

It is also possible to provide just one control circuit which respectively readjusts another PMT of the PMT array in the reference measuring times 22 falling between the measuring times 21.

With PMT arrays, the continuous change between reference and offset measurements and a corresponding sensitivity and offset correction described in detail above is also possible.

Figure 3:
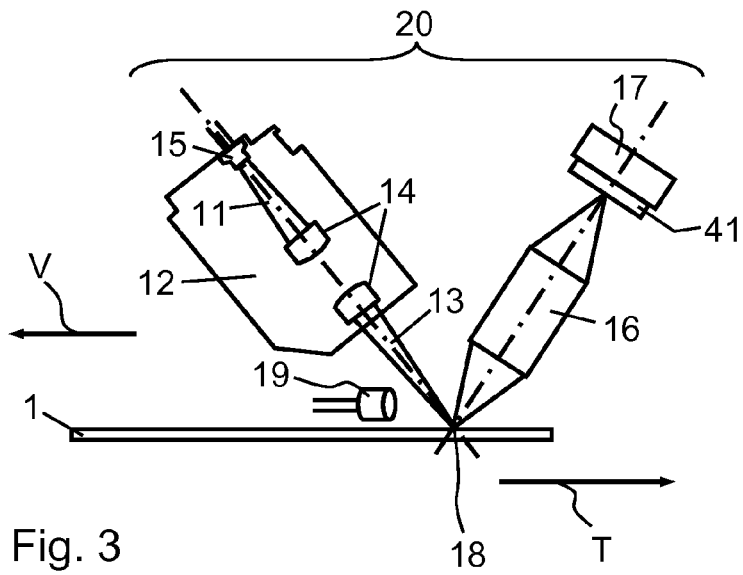
FIG. 3 is a schematic diagram showing a second exemplary embodiment of the invention.

FIG. 3 shows a second exemplary embodiment of the apparatus for implementing the method according to the invention. The storage phosphor plate 1 is irradiated with stimulation light 13 which is produced by a linear light source 12.

The light source 12 comprises several radiation sources 15, such as e.g. light emitting diodes or laser diodes, disposed in a line at right angles to the plane of the figure, and a focussing device 14 made up of two elongated cylinder lenses which focuses the divergent stimulation light bundles passing out of the radiation sources 15 onto the storage phosphor plate 1. The divergent stimulation light bundles 11 of the individual radiation sources 15 are superposed over one another at right angles to the plane of the figure in a way such that the stimulation light 13 hits the storage phosphor plate 1 in a continuous stimulation light line 18 extending at right angles to the plane of the figure.

The emission light stimulated and radiated in the region of the stimulation light line 18 in the storage phosphor plate 1 is displayed by means of a display device 16, e.g. in the form of a SELFOC, gradient index or microlens array on a linear semiconductor detector 17 and recorded by this with location resolution. For this, the semiconductor detector 17 has a plurality of light-sensitive detector elements 41 which are disposed along a line extending at right angles to the plane of the figure. The semiconductor detector 17 is preferably in the form of a CCD or photodiode line.

The light source 12, the semiconductor detector 17 and the display device 16 together form a scanner 20 which during read-out is moved relative to the storage phosphor plate 1 in feed direction V. Alternatively or in addition, the storage phosphor plate 1 can be conveyed in conveyance direction T. In this way the storage phosphor plate 1 is read out line by line similarly to the exemplary embodiment described in FIG. 1, a two-dimensional image finally being obtained.

In the example shown here, a reference light source 19 is disposed in the region of the inlet to the display device 16. The semiconductor detector 17 and the reference light source 19 are controlled by a control device (not shown) similarly to the method described in connection with FIGS. 1 and 2. Here, a whole line of the storage phosphor plate 1 is read out along the stimulation light line 18 during each respective measuring time 21, and the emission light thus collected is converted into an emission light signal. During the relative movement of the scanner 20 and the storage phosphor plate 1, this is successively read out, line by line, during a plurality of measuring times 21.

Between the measuring times 21, i.e. between the read-out of individual lines, reference measurements are taken during a plurality of reference measuring times 22, the reference light source 19 emitting reference light which is displayed by the display device 16 on the light-sensitive detector elements 41 of the semiconductor detector 17, is collected by the latter and converted into corresponding reference signals. Moreover, the explanations relating to FIGS. 1 and 2 apply correspondingly to the example.

In a particularly preferred alternative of this embodiment, the reference light source 19 is dispensed with. Here, the semiconductor detector 17 is operated during the reference measuring times 22 in a reference mode in which a reference voltage, in particular a so-called bias voltage, is applied to the semiconductor detector 7 by means of which reference signals are produced without light, such as e.g. reference light, hitting the semiconductor detector 17. The reference signals obtained in this way are similar to the reference signals obtained with reference light with the reference measurement described above, and can be used for examining the change in the sensitivity of the semiconductor detector 17 and, if appropriate, for correcting the sensitivity.

Figure 4:
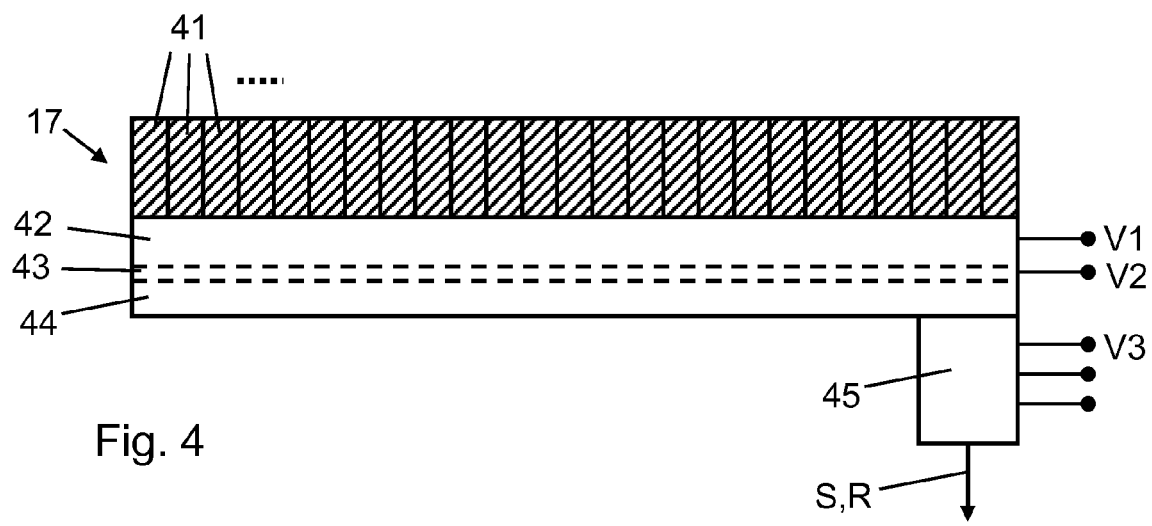
FIG. 4 diagrammatic shows the structure of a semiconductor detector used in a second exemplary embodiment.

FIG. 4 shows a diagrammatic structure of the semiconductor detector 17 which has a plurality of, typically between 1000 and 10000, light-sensitive detector elements 41 with typical dimensions of approximately 50×400 micrometers ($\mu$m) for each detector element 41. Moreover, the semiconductor detector 17 has a storage region 42 in which the loads produced by the detector elements 41 when collecting light are stored.

The storage region 42 is connected by means of a so-called transfer gate 43 to a shift register 44 to which the loads stored in the storage region 42 are transferred and conveyed one after the other to an electronic circuit 45. In the electronic circuit 45 corresponding emission light signals S are derived from the loads.

A storage gate bias voltage V1 or an anti-blooming bias voltage or a transfer gate bias voltage V2 is applied to the storage region 42 and/or to the transfer gate 43 during the reference measuring times 22 (see FIG. 2) by means of which reference signals R are produced without the semiconductor detector 17 collecting light, such as e.g. reference light. Alternatively or in addition, other or further bias voltages can be applied to the electronic circuit 45 downstream of the semiconductor detector 17, such as e.g. an output gate bias voltage V3. In this way the reference light source 19 can be dispensed with when producing reference signals R.

The reference signals R or a reference value derived from the latter gained with this embodiment of the invention are used to examine and, if appropriate, to correct sensitivity fluctuations of the semiconductor detector 17 for emission light. The reference signals R or the reference value are or is compared here to a desired reference value. In the event of an upwards or downwards deviation from the desired reference value, the sensitivity of the semiconductor detector 17 is correspondingly reduced or increased.

Moreover, the explanations to FIGS. 1 and 2 correspondingly apply to this embodiment.

In all of the examples described above, the sensitivity of the detector 7 or 17 is successively examined, and if appropriate corrected, during the read-out of a storage phosphor plate 1. Alternatively or in addition, provision can be made to correct the emission light signals S or D if the reference signals R or the reference value R' derived from the reference signals R deviate or deviates from the desired reference value R". Provision can be made here e.g. to store the reference signals R or the reference value R' derived from the reference signals R and to carry out an examination and if appropriate a correction of the digital emission light signals D also stored following the complete read-out of the storage phosphor plate 1.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for reading out X-ray information stored in a storage phosphor plate, comprising:
    irradiating the storage phosphor plate with stimulation light and so being stimulated into emitting emission light;
    collecting the emission light with a detector during several emission measuring times where the emission light is converted into corresponding emission light signals;
    during several reference measuring times, taking measurements by the detector of reference light generated by a reference light source and producing several reference signals, wherein the individual reference measuring times fall respectively between the emission measuring times;
    using the reference signals to examine the sensitivity of the detector to emission light; and
    the detector producing several offset signals during several offset measuring times in which (1) there is no irradiation of the storage phosphor plate with stimulation light and (2) the reference light source is off, from the several offset signals at least one offset value being derived which is a measure for a background which is caused by background light and/or dark currents of the detector and is used for correcting the emission light signals, wherein the individual reference measuring times and offset measuring times fall between the emission measuring times following on from one another alternately and being separated from one another by at least one measuring time respectively.

2. The method according to claim 1, further comprising deriving at least one reference value from the reference signals, said reference value being used for examining the sensitivity of the detector to emission light.

3. The method according to claim 2, further comprising deriving the reference value from the reference signals by averaging the reference signals.

4. The method according to claim 1, further comprising examining the sensitivity of the detector by comparing the reference signals or the reference value derived from the reference signals to a desired reference value.

5. The method according to claim 4, further comprising changing the sensitivity of the detector if the reference signals or the reference value derived from the reference signals deviate or deviates from the desired reference value.

6. The method according to claim 4, further comprising correcting the emission light signals if the reference signals or the reference value derived from the reference signals deviate or deviates from the desired reference value.

7. The method according to claim 1, further comprising the reference light source emitting the reference light during the reference measuring times and not emitting any reference light during the emission measuring times.

8. The method according to claim 1, wherein the reference light emitted by the reference light source has an intensity which is different in different reference measuring times.

9. The method according to claim 1, wherein the detector is a photomultiplier to which a high voltage is applied, by means of which the sensitivity of the detector is set.

10. The method according to claim 1, wherein the sum of one of the emission measuring times and a subsequent reference or offset time gives a cycle duration, and the one of the measuring times being between 60 and 80% of the cycle duration, and the reference or offset time correspondingly being between 40 and 20% of the cycle duration.

11. The apparatus for reading out X-ray information stored in a storage phosphor plate, comprising:
- a stimulation light source for irradiating the storage phosphor plate with stimulation light which can stimulate the storage phosphor plate into emitting emission light;
- a detector for collecting the emission light during several emission measuring times and for converting the emission light collected into corresponding emission light signals;
- a reference light source for emitting reference light that is detected by the detector during reference measuring times and converted into reference signals; and
- a control device for controlling the detector to take reference measurements during the reference measuring times and producing the reference signals, the reference signals being used for examining the sensitivity of the detector to emission light, and for controlling the detector to produce several offset signals during several offset measuring times in which there is no irradiation of the storage phosphor plate with stimulation light and the reference light source is off, from the several offset signals at least one offset value being derived which is a measure for a background which is caused by background light and/or dark currents of the detector and is used for correcting the emission light signals, wherein the individual reference measuring times and offset measuring times fall between the emission measuring times following on from one another alternately and being separated from one another by at least one measuring time respectively.

12. The apparatus according to claim 11, wherein the control device derives at least one reference value from the reference signals, said reference value being used for examining the sensitivity of the detector to the emission light.

13. The apparatus according to claim 12, wherein the control device derives the reference value from the reference signals by averaging the reference signals.

14. The apparatus according to claim 11, wherein the control device examines the sensitivity of the detector by comparing the reference signals or the reference value derived from the reference signals to a desired reference value.

15. The apparatus according to claim 14, wherein the control device changes the sensitivity of the detector if the reference signals or the reference value derived from the reference signals deviate or deviates from the desired reference value.

16. The apparatus according to claim 14, wherein the control device corrects the emission light signals if the reference signals or the reference value derived from the reference signals deviate or deviates from the desired reference value.

17. The apparatus according to claim 11, wherein the reference light source emits the reference light during the reference measuring times and does not emit any reference light during the emission measuring times.

18. The apparatus according to claim 11, wherein the reference light emitted by the reference light source has an intensity which is different in different reference measuring times.

19. The apparatus according to claim 11, wherein the detector is a photomultiplier to which a high voltage is applied, by means of which the sensitivity of the detector is set.

20. The apparatus according to claim 11, wherein the sum of one of the emission measuring times and a subsequent reference or offset time gives a cycle duration, and the one of the measuring times being between 60 and 80% of the cycle duration, and the reference or offset time correspondingly being between 40 and 20% of the cycle duration.

* * * * *